United States Patent
Yamaguchi et al.

(10) Patent No.: US 6,652,257 B2
(45) Date of Patent: Nov. 25, 2003

(54) APPARATUS FOR PRODUCING CERAMIC MOLDINGS

(75) Inventors: Satoru Yamaguchi, Anjo (JP); Hiromi Katou, Kuwana (JP); Nobutoshi Matsui, Nagoya (JP)

(73) Assignee: Denso Corporation, Aichi-Pref. (JP)

( * ) Notice: Subject to any disclaimer, the term of this patent is extended or adjusted under 35 U.S.C. 154(b) by 0 days.

(21) Appl. No.: 10/184,897

(22) Filed: Jul. 1, 2002

(65) Prior Publication Data

US 2002/0167102 A1 Nov. 14, 2002

Related U.S. Application Data (62) Division of application No. 09/512,276, filed on Feb. 24, 2000, now Pat. No. 6,432,341.

(30) Foreign Application Priority Data

Feb. 26, 1999 (JP) .............................................. 11-50474
Jan. 13, 2000 (JP) ........................................... 2000-4834

(51) Int. Cl.[7] .......................... B29C 47/82; B29C 47/92
(52) U.S. Cl. .................... 425/144; 425/378.1; 425/380; 425/467
(58) Field of Search ................................. 425/144, 190, 425/192 R, 378.1, 379.1, 380, 467

(56) References Cited

U.S. PATENT DOCUMENTS

| | | | | |
|---|---|---|---|---|
| 1,577,239 A | * | 3/1926 | Landgraf | 425/378.1 |
| 2,061,042 A | * | 11/1936 | Parkhurst | 425/379.1 |
| 2,245,640 A | * | 6/1941 | Beattie | 264/211.11 |
| 2,572,677 A | * | 10/1951 | Tench | 425/378.1 |
| 2,770,841 A | * | 11/1956 | Cooke et al. | 425/379.1 |
| 2,787,022 A | * | 4/1957 | Chisholm | 425/378.1 |
| 3,167,812 A | * | 2/1965 | Von Bennigsen | 425/379.1 |
| 4,082,488 A | | 4/1978 | Brinkschroder et al. | 425/204 |
| 5,427,519 A | | 6/1995 | Gellert | 425/549 |
| 5,470,219 A | | 11/1995 | Yokoyama et al. | 425/144 |
| 5,505,887 A | | 4/1996 | Zdrahala et al. | 264/127 |
| 5,639,159 A | | 6/1997 | Sato | 366/75 |
| 5,772,933 A | | 6/1998 | Kotzab | 264/40.6 |

FOREIGN PATENT DOCUMENTS

| | | |
|---|---|---|
| JP | 53-21209 | 2/1978 |
| JP | 9-277234 | 10/1997 |

* cited by examiner

*Primary Examiner*—James P. Mackey
*Assistant Examiner*—Joseph Leyson
(74) *Attorney, Agent, or Firm*—Nixon & Vanderhye PC (57) ABSTRACT

An apparatus for producing a ceramic molding having a desired shape by extruding a ceramic material includes a screw type extruder and mold connected to the distal end of the extruder through a resistance pipe. The ceramic material is pressure-fed from the extruder into the resistance pipe and is heated or cooled from round the periphery of the resistance pipe to control the shape of the ceramic molding extruded from the mold.

6 Claims, 11 Drawing Sheets

| | A FLOW VELOCITY DISTRIBUTION OF THE CERAMIC MATERIAL | THE SHAPE OF THE MOLDING |
|---|---|---|
| a |  |  |
| b |  |  |
| c |  |  |

APPARATUS FOR PRODUCING CERAMIC MOLDINGS

This application is a division of application Ser. No. 09/512,276 filed Feb. 24, 2000, now U.S. Pat. No. 6,432,341, the entire content of which is hereby incorporated by reference in this application.

BACKGROUND OF THE INVENTION

1. Field of the Invention

This invention relates to a method of, and an apparatus for, producing ceramic moldings such as ceramic honeycomb structures.

2. Description of the Related Art

Figure 12:
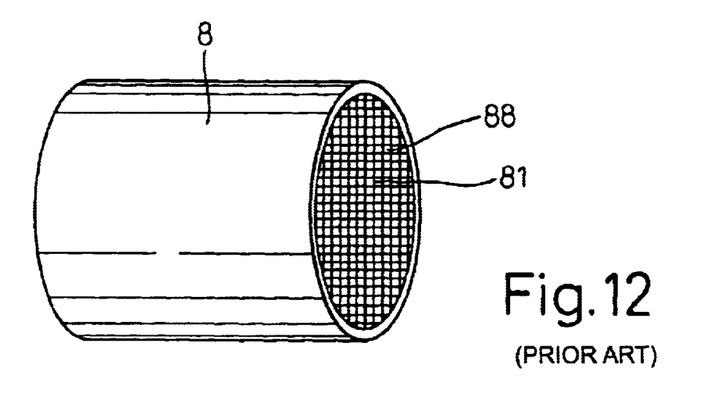
FIG. 12 is an explanatory view showing a ceramic molding (honeycomb structure) as a prior art example.

A ceramic honeycomb structure 8 having a large number of cells 88 partitioned by partitions 81, as shown in FIG. 12 of the accompanying drawings, has been used as a catalyst support of an exhaust gas purification device of an automobile. Ceramic moldings having a ceramic honeycomb structure are generally produced through extrusion molding.

Figure 13:
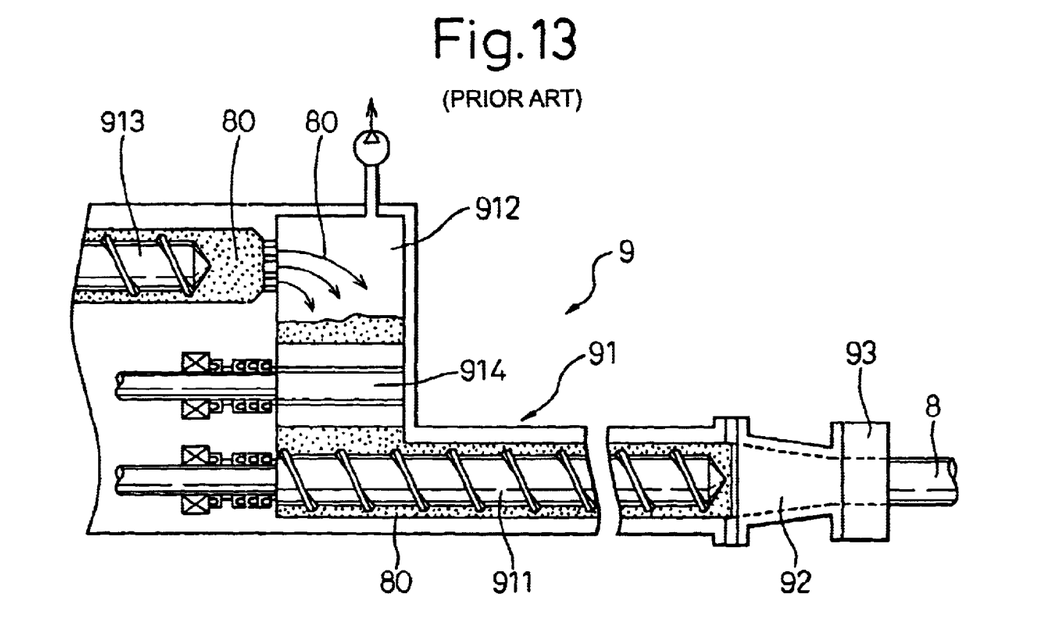
FIG. 13 is an explanatory view showing the construction of an apparatus for producing a ceramic molding as a prior art example.

A production apparatus 9 for ceramic moldings according to the prior art includes a screw type extruder 91 and a mold 93 fitted to the distal end of the extruder 91 through a resistance pipe 92 as shown in FIG. 13. A ceramic material 80, that is pressure-fed from the extruder 91 into the resistance pipe 92 with the revolution of an extrusion screw 911, is extruded from the mold 93 as a ceramic molding having a desired shape. The extrusion screw 911 is so disposed as to continue into a de-airing chamber 912 that is evacuated to a vacuum. The ceramic material 80 fed into the deairing chamber 912 by a push-in screw 913 is supplied to the extrusion screw 911 by a pair of right and left push-in rollers 914.

When a ceramic molding has a complicated shape such as a honeycomb structure, the resulting shape is greatly affected by variance of the slit hole shape of the mold 93, variance of the viscosity (variance of temperature) of the ceramic material 80, and so forth. The viscosity of the ceramic material 80, in particular, changes depending on season, time zone, etc, invites variance of the flow rate of the material, and exerts great influences on the shape of the ceramic molding.

To cope with such problems, Japanese Unexamined Patent Publication (Kokai) No. 9-277234 (prior art technology 1), for example, proposes to furnish a guide ring, that constitutes a mold, with a temperature controller for regulating the temperature of the ceramic material immediately before molding. This temperature controller can finely regulate a molding rate of the portion that serves as an outer skin of the honeycomb structure, and is believed to be capable of preventing molding defects.

Japanese Unexamined Patent Publication (Koukai) No. 53-21209 proposes to set the outer peripheral temperature of the ceramic material to a temperature by at least 10° C. higher than its center temperature between the extrusion screw and the mold (prior art technology 2). This technology is believed capable of molding continuously an excellent ceramic honeycomb structure.

Regarding the honeycomb structure, however, a demand has been increasing in recent years for reducing the thickness of partitions so as to improve its cell density. To reduce the thickness of the partitions, the extrusion resistance of the mold 93 becomes much greater than in the conventional apparatuses. The increase of the extrusion resistance makes the influences of variance of the viscosity of the ceramic material, and so forth, on the molding shape greater than ever.

Therefore, even if variance of the viscosity (temperature) of the ceramic material has not been the problem in the molding operation of the honeycomb structure having a conventional size, this variance exerts great influence on the molding shape when a honeycomb structure having a reduced thickness is produced. Consequently, it is difficult in this case to produce a honeycomb structure having an excellent shape at a high production yield.

When those ceramic moldings which are difficult to mold, such as a honeycomb body having a reduced thickness, are molded, even the methods of the prior art technologies 1 and 2 cannot smoothly produce the ceramic moldings having an excellent shape because their shape correcting effect is too small.

An explanation will be given more concretely. In the method of the prior art technology 1, the portion for regulating the temperature of the ceramic material is only the guide ring portion of the mold. Therefore, this method can regulate the temperature of only a limited outermost surface portion. If the shape defect of the molding is very serious, the method cannot easily correct the shape.

In the method of the prior art technology 2, the temperature control is limited to a certain specific condition, and only heating is available. It is therefore extremely difficult by this method to correct the shape of moldings in such a fashion as to follow accurately slight changes of the temperature, the moisture content, the grain size, etc, of the ceramic material.

SUMMARY OF THE INVENTION

In view of these problems of the prior art, it is therefore an object of the present invention to provide a method of, and an apparatus for, producing ceramic moldings that can smoothly execute a molding operation even for those moldings, the molding of which is believed to be difficult, while suppressing molding defects.

In a method of producing a ceramic molding having a desired shape by using a production apparatus including a screw type extruder and a mold connected to the distal end of the extruder through a resistance pipe, and by extruding a ceramic material, that is pressure-fed from the extruder into the resistance pipe, from the mold, the present invention provides a method of producing a ceramic molding characterized in that the ceramic material pressure-fed from the extruder into the resistance pipe is heated or cooled from round the periphery of the resistance pipe in order to control the shape of the ceramic molding extruded from the mold.

In other words, the ceramic material positioned inside the resistance pipe is positively heated or cooled in order to improve the shape of the ceramic molding.

Various means can employed as the heating or cooling means, such as means for circulating a heat medium round the resistance pipe, means for disposing a heating device such a heater round the resistance pipe, means for disposing a cooling device such as a cooler round the periphery of the resistance pipe, and so forth. The heating or cooling means can be controlled either manually or automatically in accordance with the shape of the ceramic molding.

The ceramic molding may be a honeycomb structure having a large number of cells. The ceramic honeycomb structure is relatively difficult to form. However, when the excellent molding method described above is employed, smooth molding can be easily carried out while suppressing molding detects. Particularly when the honeycomb structure has a cell density of 300 to 1,500 cells/inch$^2$ or a cell partition thickness of 0.035 to 0.125 mm, or when the cell density is 300 to 1,500 cells/inch$^2$ and the cell partition thickness is 0.035 to 0.125 mm, the function and effect of the production method described above becomes remarkable. The cell shape may be various shapes such as square, triangular, hexagonal, and so forth.

In the present invention, heating or cooling of the ceramic material is preferably carried out by circulating a heat medium, that is heated or cooled, round the resistance pipe, and by changing at least one of the circulation flow rate of the heat medium and its temperature. In this case, heating or cooling can be controlled easily.

In the present invention, the heat medium is preferably caused to circulate along a spiral flow passage round the resistance pipe. In this case, heat transfer can be achieved efficiently from the heat medium to the ceramic material inside the resistance pipe.

In the present invention, the heat medium is preferably circulated from the side of the mold towards the extruder on the periphery of the resistance pipe. When the heat medium is circulated spirally, for example, the heat medium is gradually moved from the mold side towards the extruder side while being wound round the resistance pipe. In this way, the temperature control of the ceramic material can be conducted more uniformly.

It is further preferred in the present invention to measure the temperature of the ceramic mold, that is extruded from the mold, at its outer peripheral portion and at its center, and to change the temperature of the heat medium so that the temperature difference between the outer peripheral portion and the center remains constant. According to this arrangement, the temperature of the heat medium can be controlled precisely in accordance with a change of the shape of the ceramic molding.

Next, in an apparatus for producing a ceramic molding having a desired shape, including a screw type extruder and a mold connected to the distal end of the extruder through a resistance pipe, by extruding a ceramic material, that is pressure-fed from the extruder into the resistance pipe, from the mold, the present invention provides an apparatus for producing a ceramic molding characterized in that material temperature regulation means for heating or cooling the ceramic material pressure-fed from the extruder into the resistance pipe is disposed round the resistance pipe.

It is most noteworthy in the production apparatus of the present invention that the material temperature regulation means is disposed round the resistance pipe.

Means having various structures may be used as the material temperature regulation means, as will be explained later.

Using the material temperature regulation means described above, the production apparatus of the present invention can positively heat or cool the ceramic material positioned inside the resistance pipe in accordance with the shape of the ceramic molding to be extruded. In order words, the excellent production method described above can be easily executed by using this apparatus. In other words, even when the ceramic molding is the one whose molding is believed to be difficult, the production apparatus can execute smoothly the molding operation by suppressing molding defects.

In the present invention, the material temperature regulation means preferably comprises a fluid circulation passage disposed round the resistance pipe, for circulating the heat medium and a medium supply circuit connected to the fluid circulation passage, whereby the medium supply circuit preferably includes a temperature controller for heating or cooling the heat medium and a flow rate regulator for regulating the flow rate of the heat medium. In this case, heating/cooling control can be carried out precisely when at least one of the temperature of the heat medium and its flow rate is changed.

In the present invention, the fluid circulation passage preferably comprises one chamber or space encompassing the periphery of the resistance pipe, and fins for limiting the travelling of the heat medium are preferably disposed in the space so that the heat medium can be circulated spirally. In this case, the structure of the fluid circulation passage can be simplified, and the fins can easily circulate the heat medium spirally. As the heat medium is circulated spirally, the heat transfer can be made efficient from the heat medium into the resistance pipe.

In the present invention, the fluid circulation passage preferably comprises a plurality of partitioned spaces disposed round the resistance pipe, and the heat medium can be allowed to circulate into each space. In this case, an excellent shape correction effect can be acquired even when the ceramic molding has an odd-shape such as an elliptic sectional shape, for example. In other words, local heating/cooling can be made by applying heating or cooling under the difference condition for each partitioned space of the-fluid circulation passage. Consequently, the shape correction effect can be obtained in accordance with the odd-shape.

In the present invention, the fluid circulation passage can be disposed inside a tubular body that is wound spirally round the resistance pipe. In this case, a spiral heat medium passage can be easily formed as the tubular body is wound round the resistance pipe.

In the present invention, the fluid circulation passage is preferably disposed from the mold side towards the extruder side round the periphery of the resistance pipe. This arrangement makes it possible to execute temperature control of the ceramic molding more uniformly.

In the present invention, the production apparatus preferably includes a molding thermometer for measuring the temperature of the outer peripheral portion of the ceramic molding extruded from the mold and the temperature at its center, and a heat medium temperature instruction device for calculating the difference of the actual measurement temperature between the outer peripheral portion and the center from the measurement values obtained from the molding thermometer, comparing the difference with a set temperature difference set in advance, and calculating a target temperature of the heat medium, wherein the temperature controller is controlled on the basis of the target temperature outputted from the heat medium temperature instruction device. In this case, the temperature controller can be controlled accurately in accordance with the change of the shape of the ceramic molding because the molding thermometer and the heat medium temperature instruction device are used.

The present invention may be more fully understood from the description of preferred embodiments of the invention set forth below, together with the accompanying drawings.

DESCRIPTION OF PREFERRED EMBODIMENTS

Embodiment 1:

A production method and a production apparatus of ceramic moldings according to the first embodiment of the present invention will be explained with reference to FIGS. 1 to 6.

Figure 1:
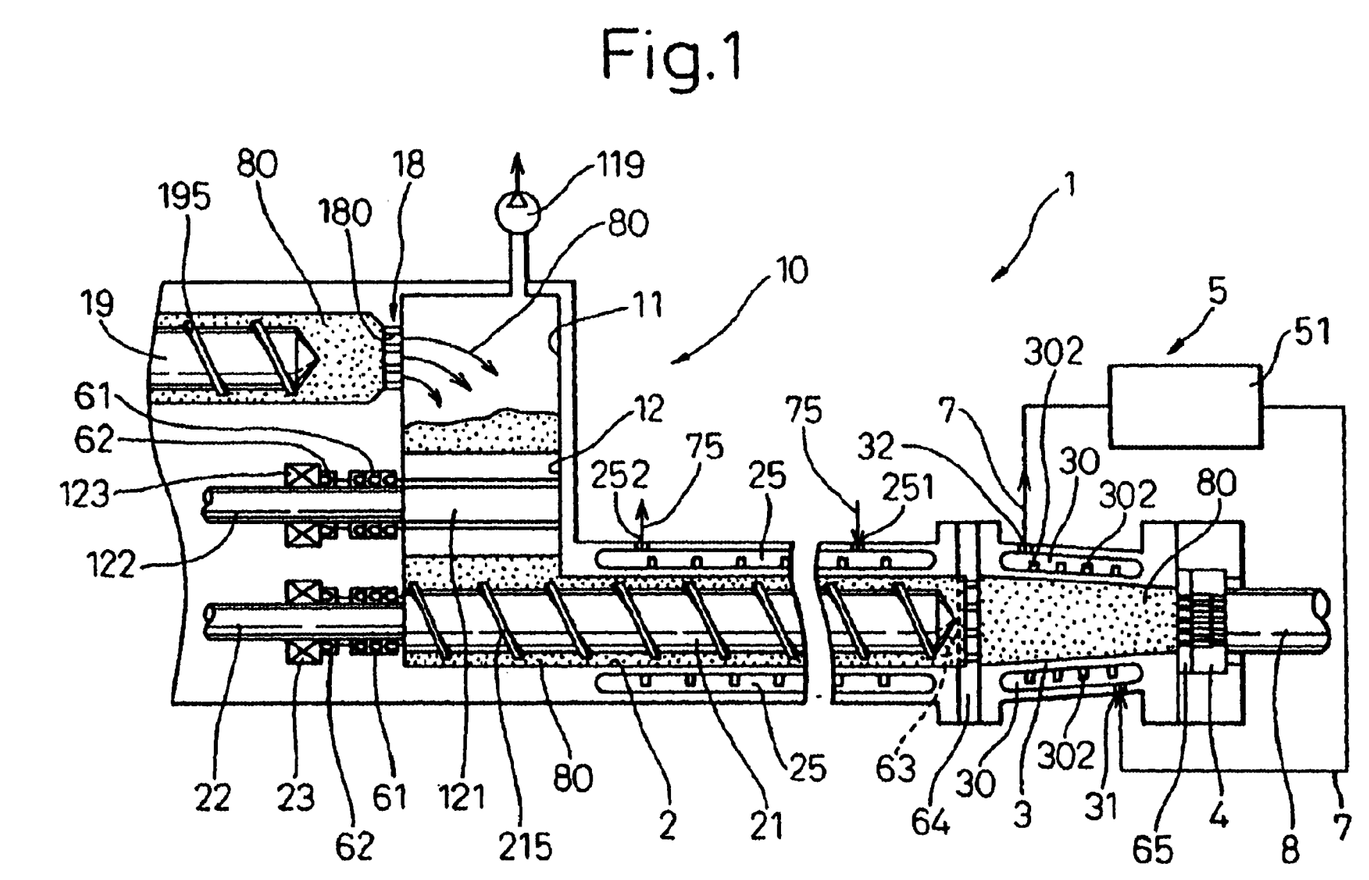
FIG. 1 is an explanatory view showing the construction of a production apparatus of ceramic moldings in an embodiment 1 of the present invention.

The production apparatus 1 of ceramic moldings of this embodiment includes a screw type extruder 10 and a mold 4 connected to the distal end of the extruder through a resistance pipe 3, as shown in FIG. 1. This apparatus extrudes the ceramic material 80, that is pressure-fed from the extruder 10 into the resistance pipe 3, from the mold 4 and produces a ceramic molding 8 having a desired shape.

Material temperature regulation means 5 is disposed round the periphery of the resistance pipe 3 to heat or cool the ceramic material 80 that is pressure-fed from the extruder 10 into the resistance pipe 3. This material temperature regulation means 5 controls the shape of the ceramic molding 8 extruded.

Hereinafter, an explanation will be given in detail.

First, the ceramic molding 8 to be produced in this embodiment is a cylindrical honeycomb structure having a large number of rectangular cells 88, as shown in FIG. 12 described above. In the honeycomb structure in this embodiment, in particular, the cell density is increased to 400 or 900 cells/in.$^2$ and the thickness of the partitions 81 is decreased down to 0.05 mm.

The material temperature regulation means 5 in this embodiment comprises a fluid circulation passage 30 for circulating a heat medium 7, disposed round the resistance pipe 3, and a medium supply circuit 51 interconnected to the fluid circulation passage 30. The medium supply circuit 51 includes a temperature controller 52 for heating or cooling the heat medium 7 and at flow rate regulator 53 for regulating the flow rate of the heat medium 7, as shown in FIG. 2.

Figure 3:
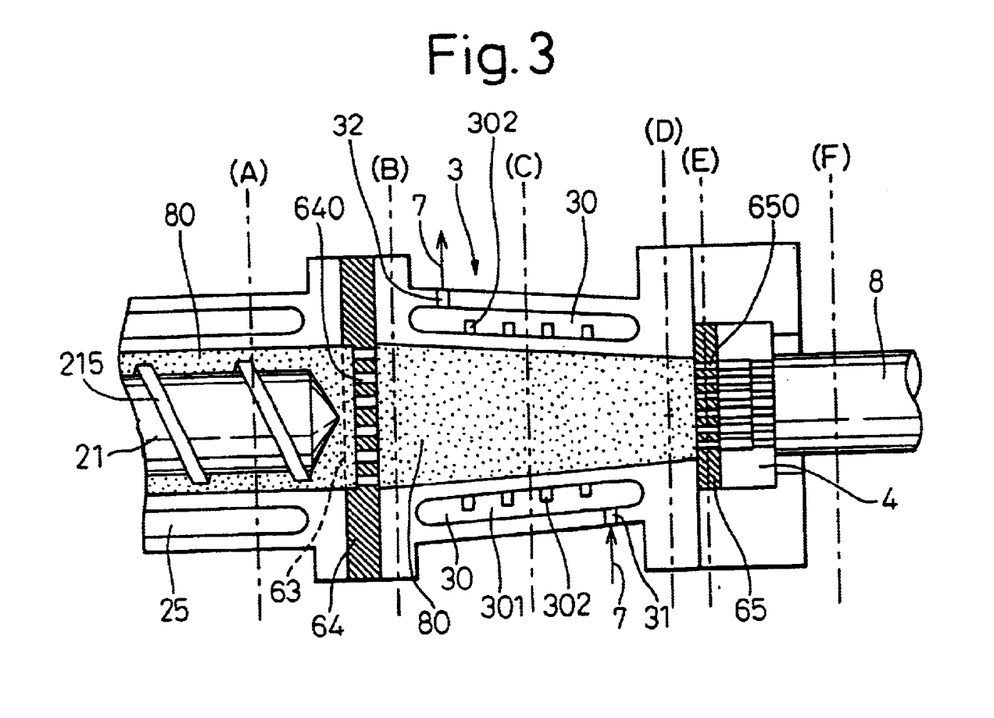
FIG. 3 is an explanatory view showing the construction of the production apparatus in the proximity of its resistance pipe in the embodiment 1 of the present invention.
Figure 4:
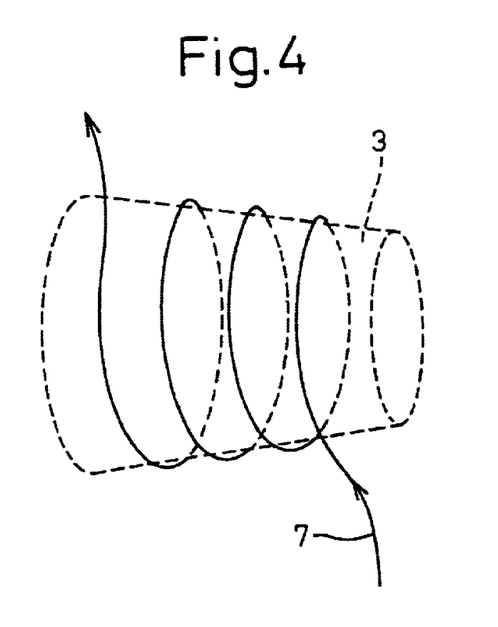
FIG. 4 is an explanatory view showing the flow of a heat medium inside a fluid circulation circuit in the embodiment 1 of the present invention.

As shown in FIGS. 1 and 3, the fluid circulation passage 30 comprises one chamber or space 301 that covers the periphery of the resistance pipe 3, and fins 302 for limiting the travelling of the heat medium 7, that are disposed spirally, are disposed in the space 301. In this embodiment, an inflow port 31 of the heat medium 7 is disposed in the resistance pipe 3 close to the mold 4, and a discharge port 32 is disposed close to the extruder 10. Accordingly, the heat medium 7 flowing into the fluid circulation passage 30 through the inflow port 31 is allowed to spirally circulate in the periphery of the resistance pipe 3 and is again discharged from the discharge port 32.

Figure 2:
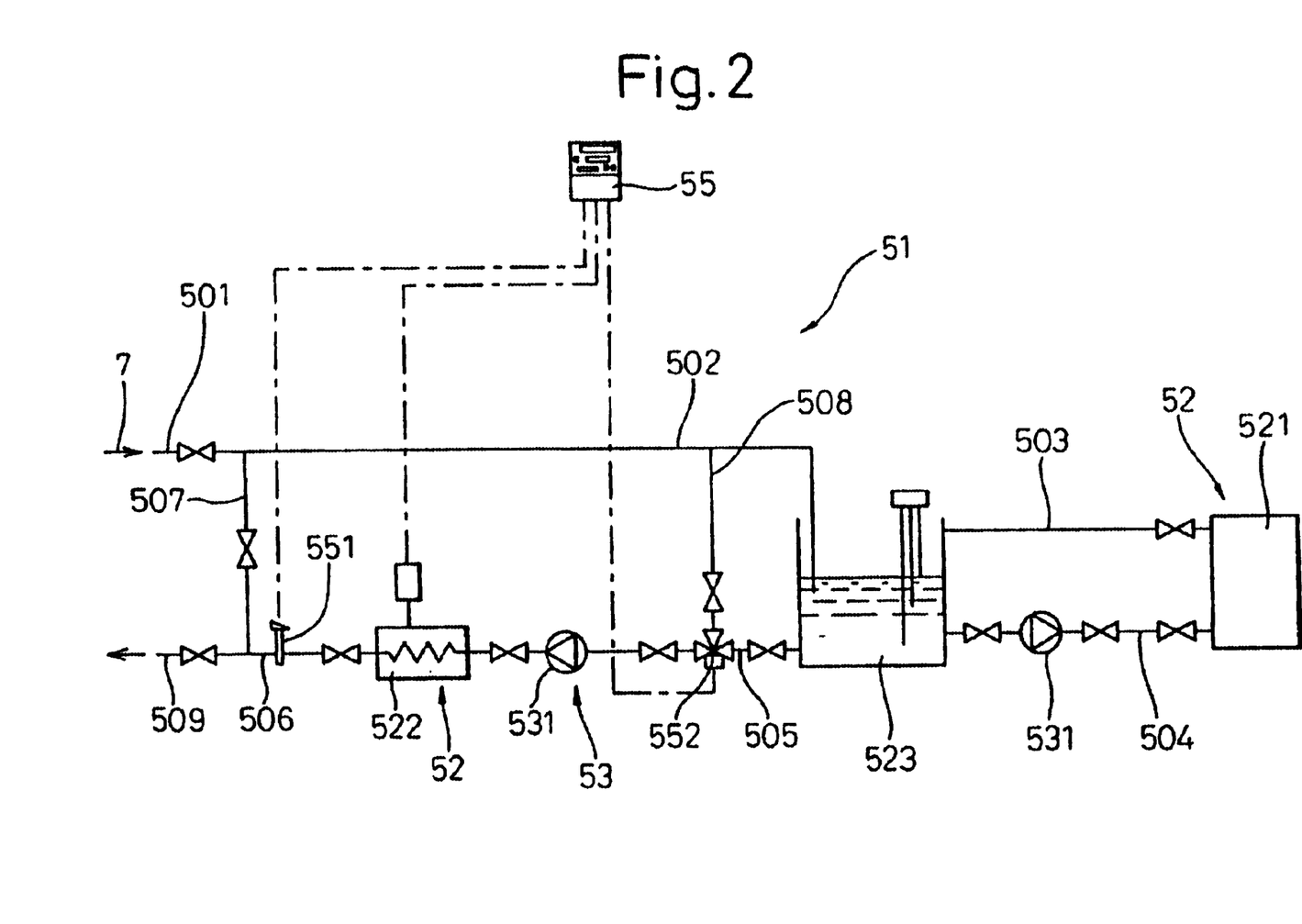
FIG. 2 is an explanatory view showing the construction of a medium supply circuit in the embodiment 1 of the present invention.

The temperature controller 52 in the medium supply circuit 51 comprises the combination of a refrigerator 521 and a heater 522 as shown in FIG. 2. The refrigerator 521 is interconnected to a cushion tank 523 through pipes 503 and 504. A first pump 531 is disposed in the pipe 504 so as to send the heat medium 7 from the cushion tank 523 to the refrigerator 521.

The cushion tank 523 is interconnected to a return port 501 of the heat medium 7 through a pipe 502 and to a heater 522 through a pipe 505. The heater 522 is interconnected to an outlet 509 of the heat medium 7 through a pipe 506. The pipes 502 and 505 are by-passed by a pipe 508, respectively.

The return port 501 of the medium supply circuit 51 interconnected to the discharge port 32 of the fluid circulation passage 30 and the outlet 509 is interconnected to the inflow port 31 of the fluid circulation passage 30.

A temperature sensor 551 for measuring the temperature of the heat medium 7 is disposed inside the pipe 506 in the proximity of the outlet 509 of the heat medium 7. A three-way valve 552 is provided to the connection portion between the pipe 505 and the pipe 508 in order to control the mixing ratio of the heat medium 7 that returns through the pipe 502 and the cooled heat medium 7 that is sent from the cushion tank 523.

The temperature sensor 551 and the three-way valve 552 are electrically connected to the controller 55. The controller 55 executes opening control of the three-way valve 552 and output control of the heater 522 in accordance with the detection data of the temperature sensor 551.

The first pump 531 that is disposed in the pipe 506 is used for the flow rate regulator 53.

Next, the construction of the extruder 10 will be explained briefly.

The extruder 10 includes a deairing chamber 11 that is evacuated to remove the air in the ceramic material 80, and a roller chamber 12 and a screw chamber 2 communicated with the deairing chamber 11, as shown in FIG. 1.

The deairing chamber 11 is communicated with the vacuum pump 119 as shown in FIG. 1 and is evacuated by the vacuum pump 119. A push-in screw 19 is interconnected to the upper side surface of the deairing chamber 11 in order to knead the ceramic material 80 and to push it into the deairing chamber 11. A partition 18 equipped with a large number of apertures 180 for supplying the material is disposed in front of the push-in screw 19. The ceramic material 80 pushed ahead by the push-in screw 19 is supplied into the deairing chamber 11 through the apertures 180 of the partition 18. Incidentally, the inside of the deairing chamber 11 can be kept in a vacuum because the ceramic material 80 itself plays the role of a sealing material.

As shown in FIG. 1, the roller chamber 12 is equipped with a pair of right and left push-in rollers 121. The push-in rollers 121 play the role of holding the ceramic material 80 supplied between them and sending it into the screw chamber 2. Therefore, the shaft portion 122 of each push-in roller, that protrudes outside, is rotatably supported by a bearing 123.

As shown in FIG. 1, the extrusion screw 21 for extruding the ceramic material 80 into the mold 4 is disposed inside the screw chamber 2. The shaft portion 22 of the extrusion screw 21, that protrudes outward, too, is supported rotatably by a bearing 23. Each of the extrusion screw 21 and the push-in screw 19 has a belt-like screw plate 215, 195 wound spirally, in the same way as in the conventional apparatuses. The revolution of these screw plates 215 and 195 pushes the ceramic material 80 ahead.

A cooling water circulation passage 25 is disposed round the screw chamber 2 of this embodiment in order to cool the ceramic material 80 inside the screw chamber 20. The cooling water circulation passage 25 comprises a cylindrical space encompassing the periphery of the screw chamber 2. A cooling water inlet 251 is provided to the distal end side of the extrusion screw 21 and a cooling water outlet 252 is provided on the shaft side.

Circulation of cooling water 75 prevents the temperature of the ceramic material 80 from being elevated by the heat of friction generated between the ceramic material 80 inside the screw chamber 2 and the extrusion screw 21.

Seal members 61 and 62 are fitted to the periphery of the shaft portion 22 of the extrusion screw 21 and to the periphery of the shaft portion 122 of the push-in roller 121, respectively, in order to prevent leaking of the ceramic material 80 and invasion of air.

A metal net support 64 is interposed between the screw chamber 2 and the resistance pipe 3 in this embodiment in order to fix a filtration net 63 for filtering the material, as shown in FIG. 3. A large number of round holes 640 for allowing the passage of the material are bored in the metal net support. A regulating plate 65 for regulating the flow rate of the ceramic material is disposed between the resistance pipe 3 and the mold 4. A large number of round hole 650 for the passage of the material are bored in this regulating plate 65, too.

Next, when the production method of the ceramic molding according to this embodiment is carried out, the ceramic material 80 that is pressure-fed from the extruder 10 into the resistance pipe 3 is heated or cooled from the periphery of the resistance pipe 3. In this way, the shape of the ceramic molding 8 extruded from the mold 4 is controlled.

In other words, the ceramic material 80 passing through the resistance pipe 3 is heated or cooled positively from round the periphery of the resistance pipe 3. In consequence, the shape of the ceramic molding 8 is positively changed to prevent any shape defect.

An example of this function and effect will be explained with reference to FIGS. 5A and 5B. These drawings show the flow velocity distribution of the ceramic material 80 in the section at the positions A to F in FIG. 3. The abscissa of each drawing represents the flow velocity and the ordinate does a vertical position in each section.

Figure 5A:
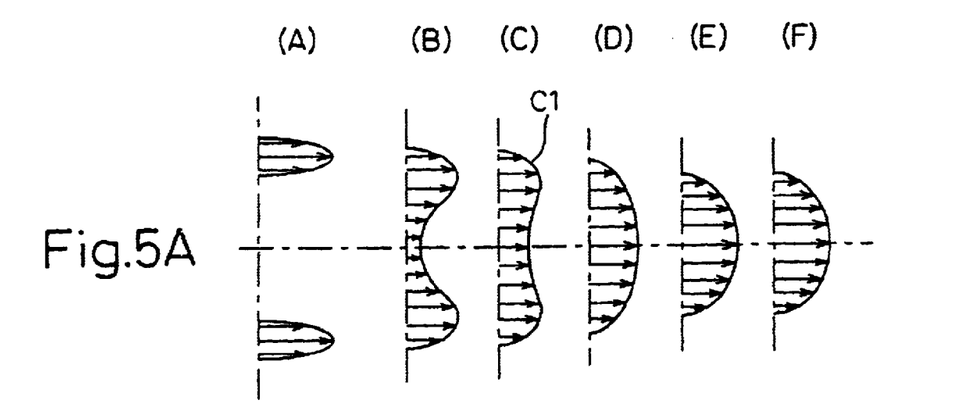
FIG. 5A shows a flow rate distribution when a ceramic material is caused to flow under a natural condition in the prior art.

FIG. 5A shows a prior art example in which temperature control from the periphery of the resistance pipe 3 is not conducted and the material is caused to flow under the natural condition. FIG. 5B shows an example of the present invention where the heat medium 7 is caused to flow through the resistance pipe 3.

Figure 5B:
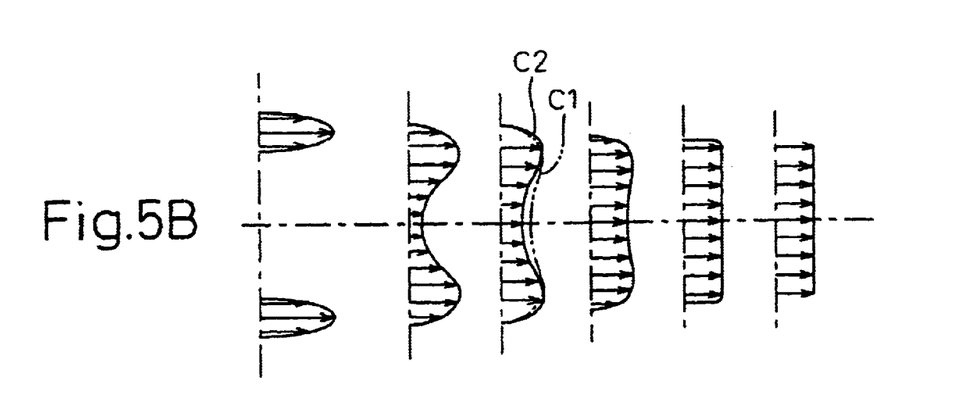
FIG. 5B shows a flow rate distribution of the ceramic material in the embodiment 1 of the present invention.

As shown in FIGS. 5A and 5B, the ceramic material 80, that is distributed only in the periphery of the extrusion screw 21 in the section A in the doughnut shape in both examples, changes to the flow of the material having a flow velocity distribution condition in which the flow becomes relatively higher at the periphery than at the center in the section B.

Figure 6:
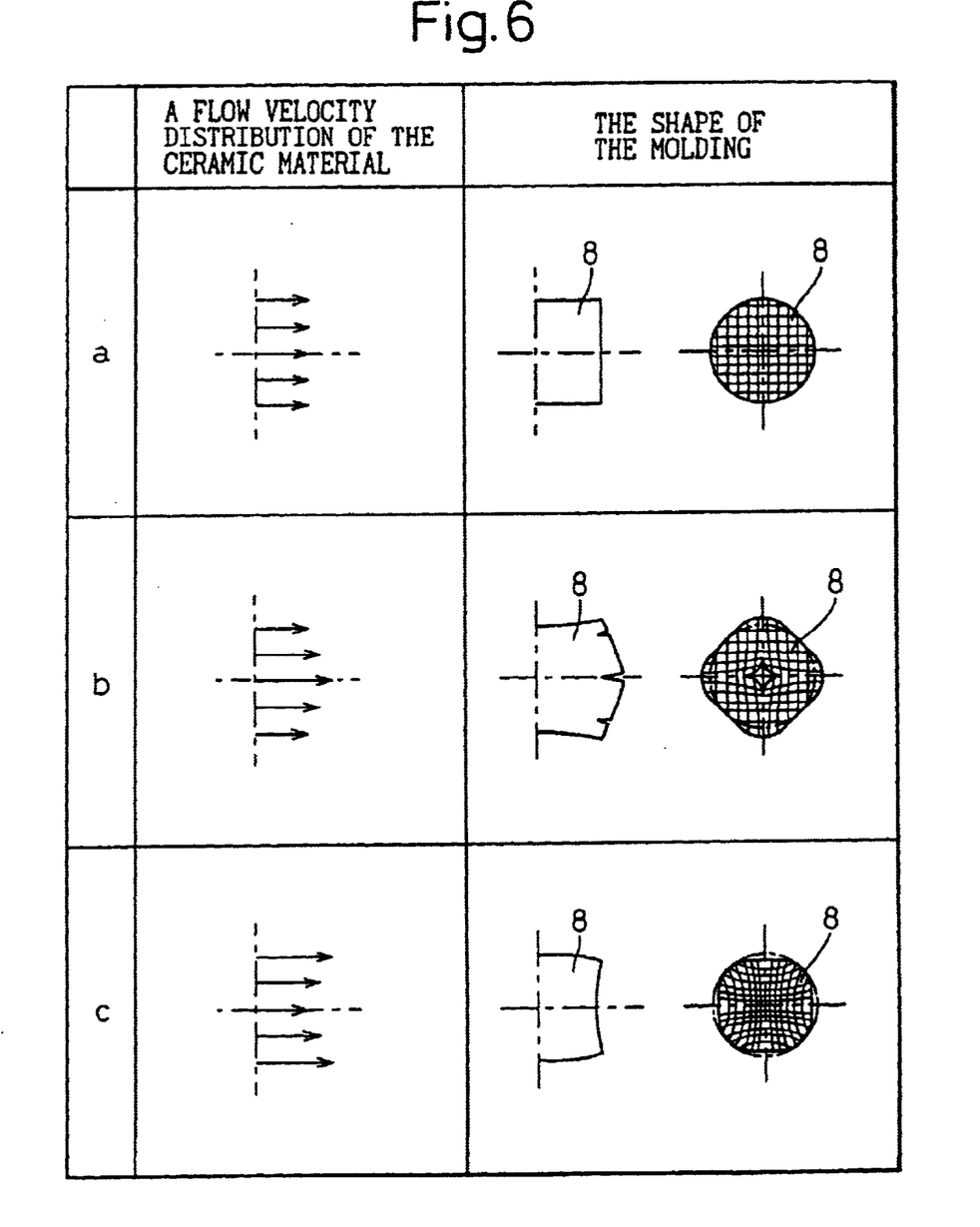
FIG. 6 is an explanatory view showing the relationship between the flow rate distribution of the material and the shape of moldings in the embodiment 1 of the present invention.

Next, as shown in FIG. 5A, the state, where this flow velocity difference changes, proceeds as such to the section C in the prior art example (C1). If the ceramic material is extruded, as such, in this condition, a molding having a thick distal end is formed as shown in later-appearing FIG. 6B because the flow velocity of the outer peripheral portion is too low. In this case, molding defects are likely to occur.

In contrast, in this embodiment, the heat medium 7, the temperature of which is positively regulated, is circulated round the resistance pipe 3 as shown in FIG. 5B. In consequence, the ceramic material 80 inside the resistance pipe 3 is heated from the outer peripheral portion, so that the temperature of the outer peripheral portion rises and the viscosity drops. As a result, the flow velocity of the ceramic material 80 at the outer peripheral portion is increased appropriately (solid portion C2). The flow velocity of the ceramic molding 8 that is subsequently extruded through the sections D and F becomes uniform. The shape of the resulting ceramic molding 8 is thus controlled to an extremely excellent shape.

This embodiment uses the temperature controller 52 in the medium supply circuit 51 as described above. Therefore, the heat medium 7 can be not only heated but also cooled. Because the flow rate regulator 53 is employed, the flow rate of the heat medium 7 can be changed, too. For these reasons, when at least one of the temperature and the flow velocity of the heat medium 7 is changed according to the shape of the resulting ceramic molding 8, the heat transfer amount from the heat medium 7 to the ceramic material 80 can be changed appropriately.

Consequently, the embodiment of the present invention can conveniently cope with various shape defects. In other words, when the shape of the resulting ceramic molding 8 is satisfactorily cylindrical as shown in FIG. 6(a), control is so made as to maintain the existing temperature and flow rate of the heat medium 7.

Next, when the molding is formed into the shape having a thick distal end as shown in FIG. 6(b), the flow velocity distribution is high at the center. Therefore, the ceramic material inside the resistance pipe 3 is heated by the heat of the heat medium 7 or by the change of the flow rate. As a result, the flow velocity distribution of the ceramic material 80 is corrected to the uniform state, and the shape of the molding is corrected to a satisfactory shape.

When the molding is shaped into the tapered shape as shown in FIG. 6(c), the flow velocity distribution of the material is high at the outer peripheral portion. Therefore, the material inside the resistance pipe 3 is cooled by cooling the heat medium 7, or changing the flow rate. In consequence, the flow velocity distribution of the ceramic material 80 is corrected to the uniform distribution, and the shape of the molding is corrected to the satisfactory shape.

In this embodiment, the periphery of the screw chamber 2 positioned on the upstream side of the resistance pipe 3 is cooled. As a result, the temperature of the ceramic material 80 sent into the resistance pipe 3 is rendered uniform to a certain extent, and the accuracy of the temperature control at the position of the resistance pipe 3 can be improved. In other words, the function and effect of the invention can be exploited effectively.

As described above, this embodiment can restrict molding-effects and can execute a smooth molding operation even in the case of a ceramic molding 8, the molding of which is difficult.

Though this embodiment represents an example of the honeycomb structure having the rectangular cells as an example of the ceramic molding 8, the function and effect of the invention can be obtained likewise in the case of honeycomb structures having various cell shapes such as triangular cells and hexagonal cells. The same function and effect can be obtained not only in the honeycomb structure but also ceramic moldings the of which is difficult.

Figures 7A, 7B:
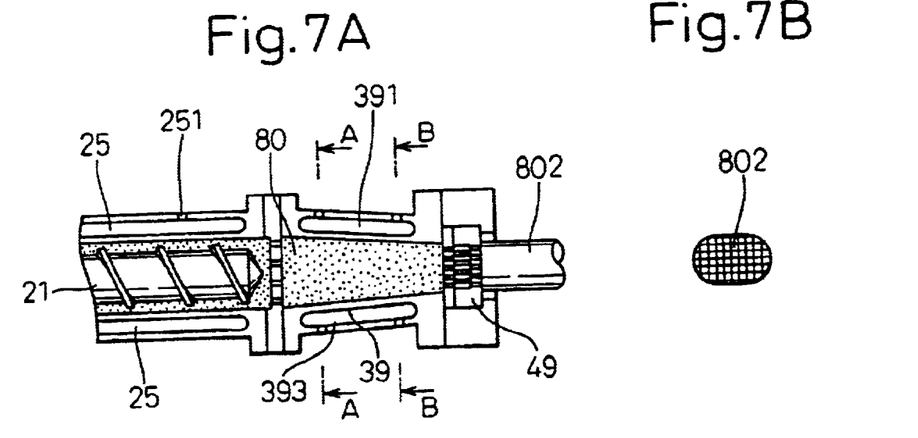
FIGS. 7A and 7B are explanatory views showing a sectional shape of a ceramic molding and the construction of a producing apparatus in the proximity of its resistance pipe in an embodiment 2 of the present invention, respectively.
Figure 8A:
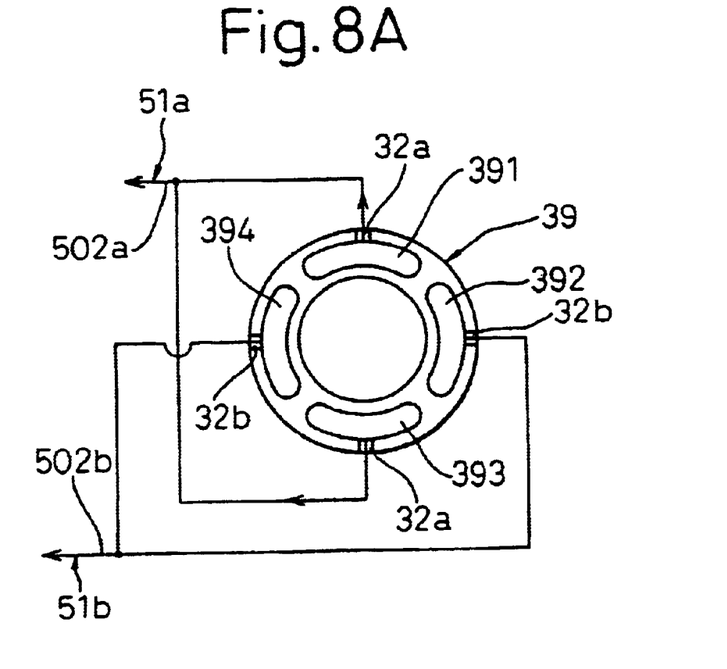
FIG. 8A is a sectional view taken along a line A—A of FIG. 7A.
Figure 8B:
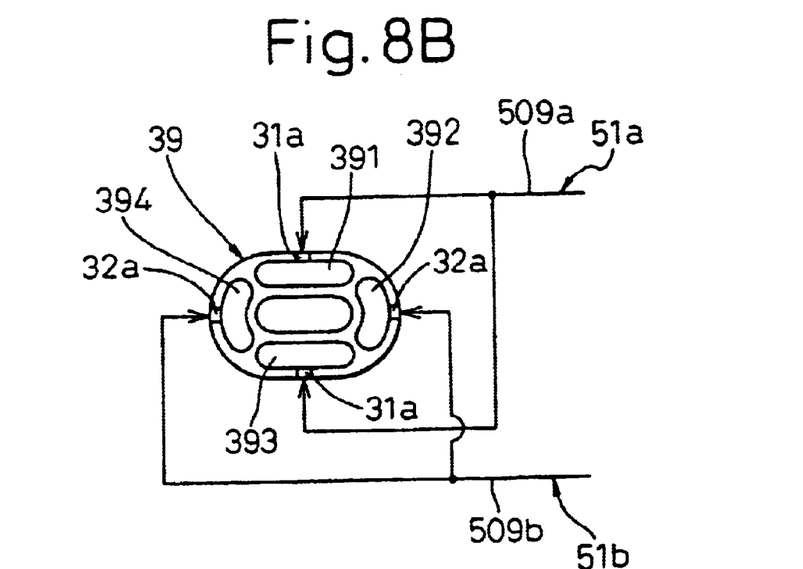
FIG. 8B is a sectional view taken along a line B—B in FIG. 7A.

Embodiment 2:

In this second embodiment, the shapes of the resistance pipe and the mold in the production apparatus 1 of the first embodiment are changed and a honeycomb structure 802 having a substantially elliptic sectional shape is produced, as shown in FIG. 7. More concretely, this embodiment uses a resistance pipe 39 the sectional shape of which changes from a round shape to a substantially elliptic shape and a mold 49 the slit shape of which is arranged in a substantially elliptic shape, as shown in FIGS. 8A and 8B. A fluid circulation passage comprising four partitioned spaces 391 to 394 are disposed round the resistance pipe 39 so that the heat medium 7 can be circulated through each of these spaces 391 to 394.

In this embodiment, two systems of medium supply circuits are disposed. A medium supply line 51a of the first system is connected in parallel with the upper and lower spaces 391 and 392 and the medium supply line 51b of the second system is connected in parallel with the right and left spaces 392 and 394.

More concretely, the pipe 509a of the medium supply line 51a on the outlet side is branched into two lines as shown in FIGS. 8A and 8B, and they are connected to the inflow ports 31a of the upper and lower spaces 391 and 393, respectively. The pipe 502a of the medium supply line 51a on the return port side is likewise branched into two lines, and they are connected to the discharge ports 32a of the upper and lower spaces 391 and 393, respectively.

Similarly, the pipe 509b of the medium supply line 51b on the outlet side is branched into to lines, and they are connected to the inflow ports 32a of the right and left spaces 392 and 394, respectively. The pipe 502b of the medium supply line 51b on the return port side is branched into two lines, and they are connected to the discharge ports 32b of the right and left spaces 392 and 394, respectively. Incidentally, the construction of each medium supply line 51a, 51b is the same as the medium supply line 51 of the first embodiment.

The rest of the construction is the same as that of the first embodiment.

This embodiment can execute easily and highly accurately the shape control of the odd-shaped ceramic moldings the shape control of which has been difficult according to the prior art. When the honeycomb structure 802 has a substantially elliptic shape as in this embodiment, it is sometimes difficult to bring the flow velocities into conformity on the major diameter side and the minor diameter side when heating or cooling is made merely from the outer peripheral side without non-uniformity on an average. In contrast, this embodiment can heat or cool independently the major diameter side and the minor diameter side independently of each other. Therefore, this embodiment can control heating or cooling so that the optimum temperature condition can be established in accordance with the shape of the ceramic molding.

This embodiment can provide the same function and effect as the first embodiment.

Embodiment 3:

In the production method and the production apparatus of the ceramic molding in the first embodiment, this represents a concrete example where temperature control for changing the temperature of the heat medium is added so that the temperature difference between the outer peripheral portion and the center portion becomes constant, by measuring the temperatures at the outer peripheral portion and at the center of the ceramic molding 8 extruded from the mold 4.

Figure 9:
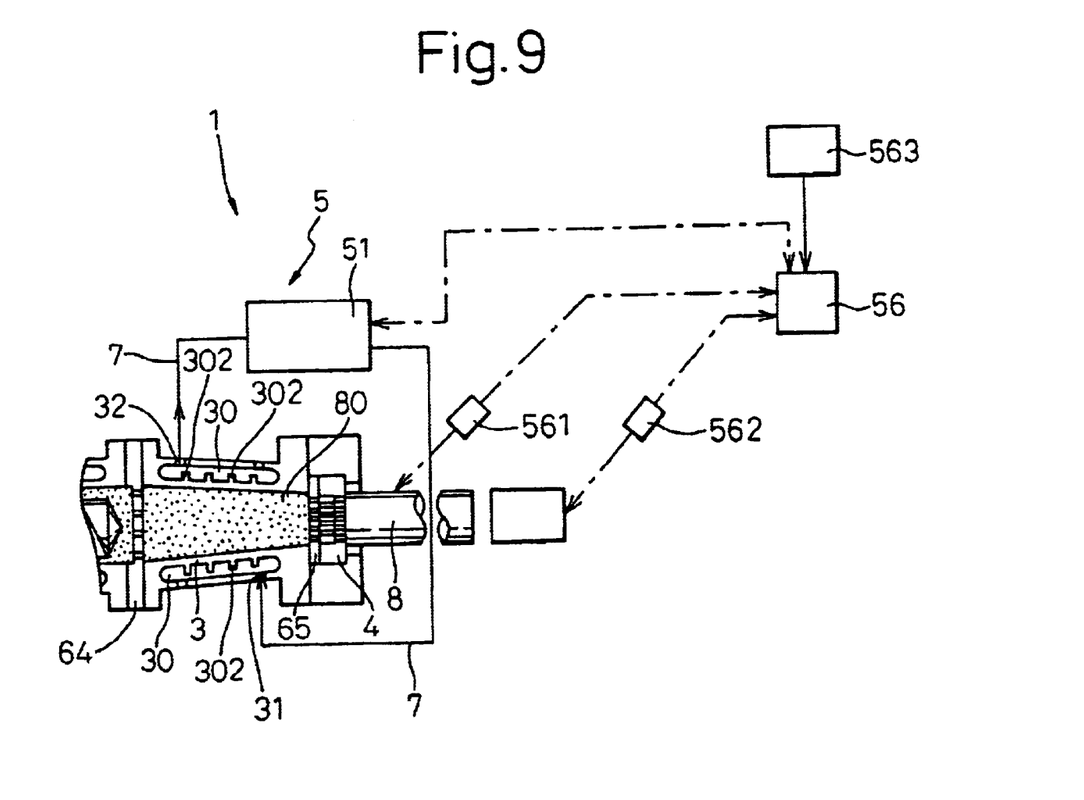
FIG. 9 is an explanatory view showing the arrangement of a molding thermometer and a heat medium temperature instruction device in an embodiment 3 of the present invention.

As shown in FIG. 9, the production apparatus 1 of this embodiment includes two molding thermometers 561 and 562 for measuring the temperature of the outer peripheral portion of the ceramic molding 8 extruded from the mold 4 and its center portion. They are temperature sensors of a non-contact type. As shown in the drawing, the molding thermometer 561 for measuring the outer peripheral portion is so set as to measure the temperature of the outer peripheral surface of the as-extruded ceramic molding 8 extruded from the mold 4. The molding thermometer 562 for measuring the center temperature is so set as to measure the temperature of the cut center of the extruded ceramic molding 8.

As shown in FIG. 9, further, the two molding thermometers 561 and 562 are electrically connected to a heat medium temperature instruction device 56. This instruction device 56 calculates the difference of the temperatures, that are actually measured, of the outer peripheral portion and the inner peripheral portion from the measurement values obtained from the molding thermometers 561 and 562, compares this actual measurement temperature difference with a set temperature difference that is set in advance, and calculates a target temperature of the heat medium.

Figure 10:
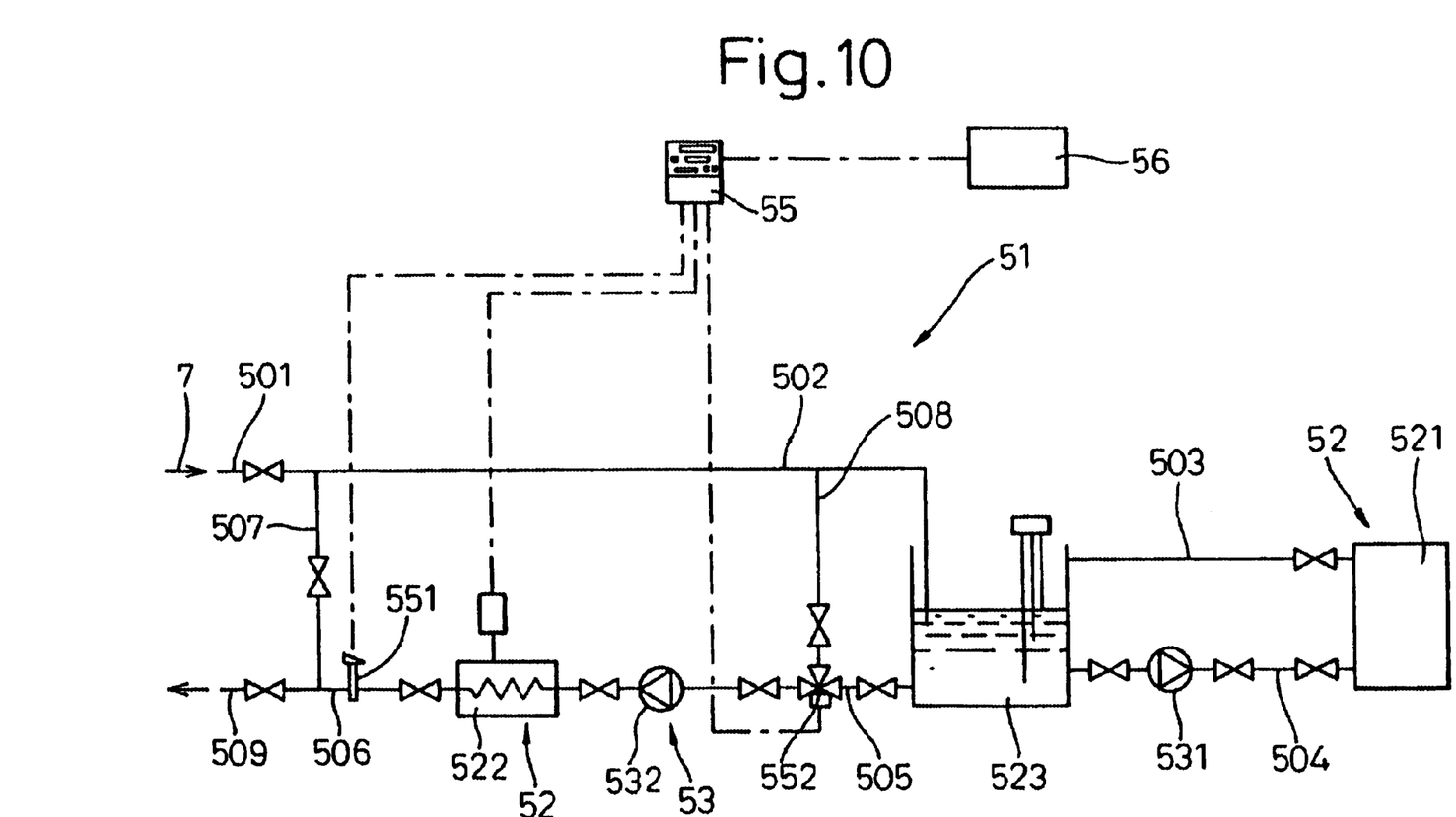
FIG. 10 is an explanatory view showing the relationship between a medium supply circuit and the heat medium temperature instruction device in the embodiment 3 of the present invention.

The heat medium temperature instruction device 56 is connected to the material temperature regulation means 5 described already, and controls the temperature controller 52 on the basis of the target temperature sent from the heat medium temperature instruction device 56. More concretely, as shown in FIG. 10, the heat medium temperature instruction device 56 is electrically connected to the controller 55 in the material temperature regulation means 5, and controls this controller 55 so as to control the heat medium temperature. Incidentally, the heat medium temperature instruction device 56 is connected to a temperature difference setter 563, which sets the set temperature difference upon receiving an input given thereto.

An example of the control executed using the production apparatus 1 having the construction described above will be explained briefly with reference to FIG. 11.

Figure 11:
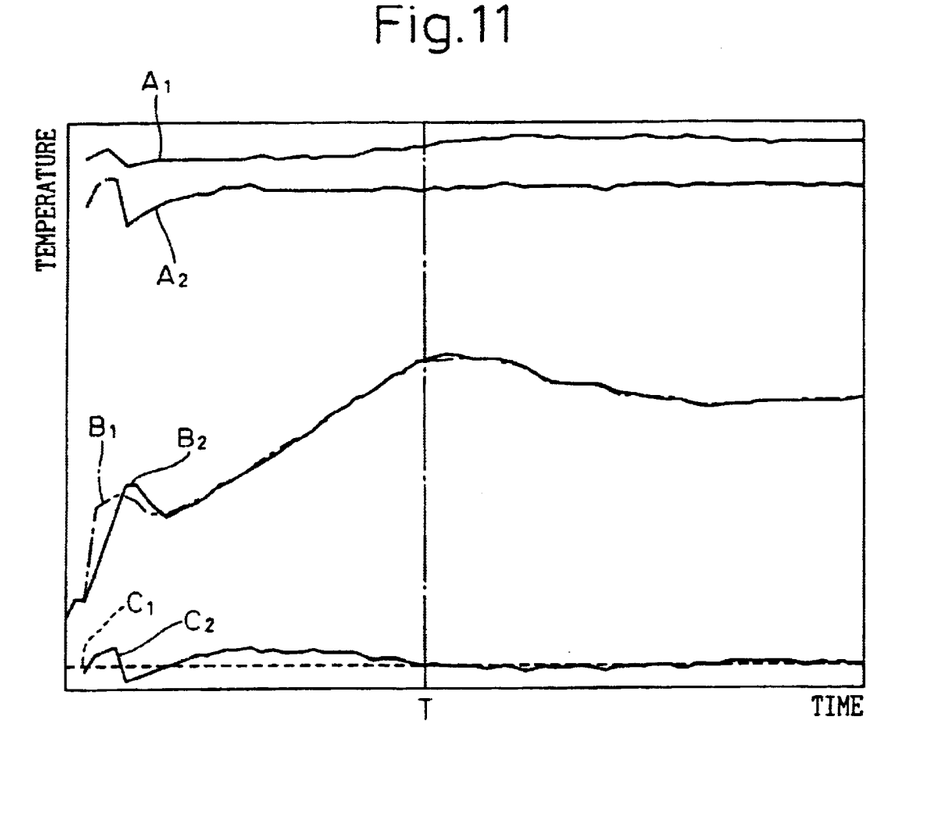
FIG. 11 is an explanatory view showing an example of temperature control in the embodiment 3 of the present invention.

In FIG. 11, the abscissa represents the time and the ordinate does the temperature. The actual measurement value $A_1$ of the outer peripheral portion of the ceramic molding 8 and the actual measurement value $A_2$ of its center portion are plotted in the upper part of the graph. The set value $B_1$ and the actual measurement value $B_2$ for controlling the heat medium temperature are plotted in the middle part. The set value $C_1$ of the temperature difference between the outer peripheral portion and the center portion of the ceramic molding 8 and the calculation value $C_2$ from the actual measurement values $A_1$ and $A_2$ are plotted in the lower part.

As can be seen from this graph, variance of the temperature difference $C_2$ between the outer peripheral portion and the center portion is great and unstable in the initial stage of the production (before the time T). The heat medium temperature instruction device 56 grasps this condition and controls the controller 55 so that the set value $B_1$ of the heat medium temperature can be changed as shown in the graph, thereby changing also the actual measurement value $B_2$, too.

As a result, the temperature $A_1$ of the outer peripheral portion can be elevated stably after the passage of the time T and the temperature difference $C_2$, too, substantially settles at the target value.

When the control described above is conducted, a ceramic molding having extremely excellent quality can be obtained at least after the passage of the time T.

As described above, the present invention heats or cools the ceramic material passing through the resistance pipe from the periphery of the resistance pipe and controls the shape of the ceramic molding. When a shape defect occurs because the molding rate of the ceramic molding is higher at the outer peripheral portion than at the inside, for example, the present invention cools the ceramic material inside the resistance pipe and lowers fluidity at the outer peripheral portion. On the other hand, when the shape defect occurs because the molding rate of the ceramic molding is lower at the outer peripheral portion than at the inside, the present invention heats the ceramic material inside the resistance pipe and increases fluidity at the outer peripheral portion. As a result, the shape of the resulting ceramic molding can be improved to a satisfactory shape.

The present invention also heats or cools the ceramic material inside the resistance pipe over the broad range from the periphery of the resistance pipe. As a result, the present invention can improve the heat transfer capacity to the ceramic material much more than the prior art technology 1, for example, and can increase the shape correcting capacity.

The present invention conducts the heat transfer from the periphery of the resistance pipe by not only heating but also cooling. Therefore, the present invention can cope with various shape defects and can easily correct the shapes.

While the present invention has thus been described with reference to some specific embodiments chosen for purposes of illustration, it should be apparent that numerous modifications could be made thereto by those skilled in the art without departing from the basic concept and scope of the invention.

What is claimed is:

1. An apparatus for producing a ceramic molding having a desired shape, said apparatus comprising:

a screw extruder and a mold connected to a distal end of said extruder through a resistance pipe, for extruding a ceramic material pressure-fed from said extruder into said resistance pipe:

material temperature regulation means for heating or cooling said ceramic material pressure-fed from said extruder into said resistance pipe, and being disposed around said resistance pipe;

wherein said material temperature regulation means comprises a fluid circulation passage for circulating a heat medium, disposed around said resistance pipe, and a medium supply circuit interconnected to said fluid circulation passage, and said medium supply circuit includes a temperature controller for heating or cooling said heat medium and a flow rate regulator for regulating a flow rate of said heat medium;

molding thermometers for measuring a temperature at an outer periphery of said ceramic molding extruded from said mold and a temperature at its center; and a heat medium temperature instruction device for calculating a difference of an actual measurement temperature between an outer peripheral portion and an inner peripheral portion of said ceramic molding from measurement values obtained from said molding thermometers, comparing it with a pre-set temperature difference set in advance and calculating a target temperature of said heat medium, and wherein said temperature controller is controlled on the basis of said target temperature from said heat medium temperature instruction device.

2. An apparatus for producing a ceramic molding according to claim 1, wherein said ceramic molding is a honeycomb structure having a plurality of cells, and the mold is configured to produce the honeycomb structure.

3. An apparatus for producing a ceramic molding according to claim 1, wherein said fluid circulation passage comprises a space of one chamber covering a periphery of said resistance pipe, and fins for restricting a flowing passage of said heat medium are disposed spirally in said space and spirally circulate said heat medium.

4. An apparatus for producing a ceramic molding according to claim 1, wherein said fluid circulation passage comprises a plurality of partitioned spaces disposed round said resistance pipe, and circulates said heat medium into each of said spaces.

5. An apparatus for producing a ceramic molding according to claim 1, wherein said fluid circulation passage is disposed inside a tubular body wound spirally round said resistance pipe.

6. An apparatus for producing a ceramic molding according to claim 1, wherein said fluid circulation passage is disposed from the side of said mold to the side of said extruder round said resistance pipe.

* * * * *